United States Patent [19]

Maezawa et al.

[11] Patent Number: 5,904,995

[45] Date of Patent: May 18, 1999

[54] RARE EARTH ACTIVATED ALKALINE EARTH METAL FLUOROHALIDE STIMULATE PHOSPOR AND RADIATION IMAGE CONVERSION

[75] Inventors: Akihiro Maezawa; Haruhiko Masutomi; Yasushi Nakano; Hideaki Wakamatsu, all of Hino, Japan

[73] Assignee: Konica Corporation, Japan

[21] Appl. No.: 08/996,374

[22] Filed: Dec. 22, 1997

[30] Foreign Application Priority Data

Dec. 25, 1996 [JP] Japan ...................................... 8-356038
Jan. 23, 1997 [JP] Japan ...................................... 9-024211

[51] Int. Cl.$^6$ .................................................... C09K 11/16
[52] U.S. Cl. .................................. 428/690; 252/301.4 H; 252/301.4 R; 250/484.4
[58] Field of Search ..................... 252/301.4 H, 301.4 R; 250/484.4; 428/690

[56] References Cited

U.S. PATENT DOCUMENTS 5,534,191 7/1996 Hasegawa et al. .............. 252/301.4 H

FOREIGN PATENT DOCUMENTS 0712917 5/1996 European Pat. Off. .

OTHER PUBLICATIONS

European Search Report EP 97 31 0495 XP–002059224 1 pg. Abstract.

*Primary Examiner*—Charles Nold
*Attorney, Agent, or Firm*—Jordan B. Bierman; Bierman, Muserlian and Lucas

[57] ABSTRACT

A stimulable phosphor is disclosed, comprising a rare earth activated alkaline earth metal fluorohalide stimulable phosphor, wherein the rare earth of the phosphor is a rare earth metal selected from the group consisting of Eu, Ce and Gd and the content of the rare earth metal in the surface portion of the particles of the stimulable phosphor being less that in a central portion of said particles. Disclosed is also a radiation image conversion panel comprising a support having thereon a phosphor layer containing the stimulable phosphor.

10 Claims, No Drawings

ND RADIATION
RARE EARTH ACTIVATED ALKALINE EARTH METAL FLUOROHALIDE STIMULATE PHOSPOR AND RADIATION IMAGE CONVERSION

FIELD OF THE INVENTION

The present invention relates to a rare earth activated alkaline earth metal fluoride stimulable phosphor, a method for preparing the stimulable phosphor and a radiation image conversion panel by the use of the stimulable phosphor.

BACKGROUND OF THE INVENTION

As a method replacing a conventional radiography, there is known a radiation image recording and reproducing method utilizing stimulable phosphor, as described in JP-A 55-12145 (herein, the term "JP-A" means an unexamined and published Japanese Patent Application). In the method, a radiation image conversion panel (in other words, an image storage phosphor sheet) comprising a stimulable phosphor is employed, and the method comprises the steps of causing the stimulable phosphor of the panel to absorb radiation having passed through an object or having radiated from an object, sequentially exciting the stimulable phosphor with an electromagnetic wave such as visible light or infrared rays (hereinafter referred to as "stimulating rays") to release the radiation energy stored in the phosphor as light emission (stimulated emission), photoelectrically detecting the emitted light to obtain electric signals, and reproducing the radiation image of the object as a visible image from the electric signals. The panel having been read out is subjected to image-erasing and prepared for the next photographing cycle. Thus, the radiation image conversion panel can be used repeatedly.

In the radiation image recording and reproducing methods described above, radiation image is advantageously obtained with a sufficient amount of information by applying radiation to an object at a considerably smaller dose, as compared to conventional radiography employing a combination of a radiographic film and a radiographic intensifying screen. Further, in the conventional radiography, the radiographic film is consumed for every photographing; on the other hand, in this radiation image converting method, in which the radiation image conversion panel is employed repeatedly, is also advantageous in terms of conservation of resources and economic efficiency.

The stimulable phosphor, after being exposed to radiation, exhibits stimulated emission upon exposure to the stimulating ray. In practical use, phosphors are employed, which exhibit an emission within a wavelength region of 300 to 500 nm stimulated by stimulating light with wavelengths of 400 to 900 nm.

The radiation image conversion panel employed in the radiation image recording and reproducing method basically comprises a support and provided thereon a phosphor layer (stimulable phosphor layer), provided that, in cases where the phosphor layer is self-supporting, the support is not necessarily required. The stimulable phosphor layer comprises a stimulable phosphor dispersed in a binder. There is also known a stimulable phosphor layer, which is formed by vacuum evaporation or a sintering process, free from a binder and comprises an aggregated stimulable phosphor.

There is further known a radiation image conversion panel in which a polymeric material is contained in the openings among the aggregated stimulable phosphor. In these phosphor layers, the stimulable phosphor also exhibits stimulated emission upon exposure to the stimulating rays after absorbing radiation such as X-rays, so that the radiation having passed through an object or having been emitted from the object, is absorbed by the stimulable phosphor layer of the radiation image conversion panel, in proportion to the radiation amount and a radiation image of the object is formed on the panel, as a storage image of radiation energy. The storage image can be released by irradiating the stimulating ray, as stimulating emission light, which is photoelectrically read and transformed into electric signals to form an image as the storage image of radiation energy.

On the surface of the stimulable phosphor layer (i.e., the surface which is not in contact with the support) is conventionally provided a protective layer comprising a polymeric film or an evaporated inorganic membrane to protect the phosphor layer from chemical deterioration and physical shock.

Examples of the stimulable phosphor used in the radiation image conversion panel include a rare earth activated alkaline earth metal fluorohalide phosphor represented by the formula of $(Ba_{1-x}, M^{2+}_x)FX:yA$, as described in JP-A 55-12145, in which $M^{2+}$ is at least one of Mg, Ca, Sr, Zn and Cd; X is at least one of Cl, Br and I; A is at least one of Eu, Tb, Ce, Tm, Dy, Pr, Ho, Nd, Yb, and Er; x and y are numbers meeting the conditions of $0 \leq x \leq 0.6$ and $0 \leq y \leq 0.2$; and the phosphor may contain the following additives.

In the above-described phosphors, there has not been paid any attention with respect to a rare earth metal in the composition of the surface or central portion of the stimulable phosphor and in particular, to the content of Eu. It was found by the present inventors that in cases when the composition in the surface portion of the stimulable phosphor is the same as that of the central portion, the level of lattice defects in the surface portion is greatly enhanced and particularly in the case of halide phosphors, instantaneous emission upon exposure to X-rays in the phosphor surface increases, resulting in an increase of an afterglow value of the instantaneous emission. In this case, when reading a radiation image stored in the stimulable phosphor after exposure to X-rays from a radiation image conversion panel, the instantaneous emission afterglow value is added, as a noise component, to read-out signals, leading to lowering of the S/N ratio.

Furthermore, in the case when the afterglow value of the instantaneous emission becomes greater, problems are produced such that high-speed photographing by the panel becomes impossible or becomes more sensitive to unevenness of the X-ray dosage produced at an X-ray source.

SUMMARY OF THE INVENTION

It is an object to solve the above-mentioned problems and in particular to provide a rare earth activated alkaline earth metal fluorohalide stimulable phosphor, a method for preparing the stimulable phosphor and a radiation image conversion panel using the stimulable phosphor, which leads to superior image characteristics including sensitivity, erasability and an afterglow value of instantaneous emission (S/N ratio), a preparing method thereof and a radiation image conversion panel by the use thereof.

The above object can be accomplished by the following constitutions:

(1) A stimulable phosphor comprising a rare earth activated alkaline earth metal fluorohalide stimulable phosphor, wherein the content of a rare earth metal in a surface portion of the particles of the stimulable phosphor is less that in a central portion thereof, and the rare earth metal being selected from the group consisting of Eu, Ce and Gd.

(2) The stimulable phosphor described in above (1), wherein composition of the central portion of the stimulable phosphor particles is represented by the following formula:

BaFX:xA wherein X represents at least a halogen atom selected from the group consisting of Cl, Br and I; A represents a rare earth metal selected from the group consisting of Eu, Ce and Gd; and x is a number meeting the condition of $0.0001 \leq x \leq 0.2$.

(3) The stimulable phosphor described in (2), wherein X is I and a halogen atom selected from the group consisting of Cl and Br.

(4) The stimulable phosphor described in (2), wherein A is Eu.

(5) The stimulable phosphor described in (2), wherein the stimulable phosphor further contains an impurity M1, M2 or M3, where M1 is an alkaline earth metal selected from the group consisting of Ca, Mg and Sr and contained in an amount of $5.0 \times 10^{-6}$ to 0.1% by weight; M2 is at least one selected from the group consisting of $SiO_2$, $TiO_2$, $Al_2O_3$, $InF_3$, $Ga_2O_3$ and $Fe_2O_3$ and contained in an amount of $5.0 \times 10^{-7}$ to 0.1% by weight; and M3 is an alkaline metal selected from the group consisting of Na, K and Rb and contained in an amount of $1.0 \times 10^{-5}$ to 0.1% by weight.

(6) A radiation image conversion panel comprising a support having thereon a phosphor layer containing a stimulable phosphor, wherein said stimulable phosphor comprises a rare earth activated alkaline earth metal fluorohalide stimulable phosphor, a content of a rare earth metal in a surface portion of the stimulable phosphor being less that in a central portion thereof, and said rare earth metal being selected from the group consisting of Eu, Ce and Gd.

(7) The radiation image conversion panel described in above (6), wherein composition of the central portion of said stimulable phosphor is represented by the following formula:

BaFX:xA wherein X represents a halogen atom selected from the group consisting of Cl, Br and I; A represents a rare earth metal selected from the group consisting of Eu, Ce and Gd; and x is a number within the range of $0.0001 \leq x \leq 0.2$.

(8) The radiation image conversion panel described in (7), wherein X is I and a halogen atom selected from the group consisting of Cl and Br.

(9) The radiation image conversion panel described in (7), wherein A is Eu.

(10) The radiation image conversion panel described in (7), wherein said stimulable phosphor further contains an impurity M1, M2 or M3, where M1 is an alkaline earth metal selected from the group consisting of Ca, Mg and Sr and contained in an amount of $5.0 \times 10^{-6}$ to 0.1% by weight; M2 is at least one selected from the group consisting of $SiO_2$, $TiO_2$, $Al_2O_3$, $InF_3$, $Ga_2O_3$ and $Fe_2O_3$ and contained in an amount of $5.0 \times 10^{-7}$ to 0.1% by weight; and M3 is an alkaline metal selected from the group consisting of Na, K and Rb and contained in an amount of $1.0 \times 10^{-5}$ to 0.1% by weight.

DETAILED DESCRIPTION OF THE INVENTION

The central portion and the surface portion of a phosphor particle relating to the invention are defined as follows. The center of the phosphor particle is defined as the point where the longest span of the particle (l) and the width (W) which is in the direction perpendicular to l, cross. The central portion of the particle is a region within radius of 0.2 μm from the center. The surface portion is a region excluding the central portion of the particle.

The composition of the surface portion and central portion of the phosphor can be determined, for example, according to the following simplified procedure. A phosphor sample is allowed to be dipped into aqua regia to decompose from the surface of phosphor particles and when the phosphor particles become 0.2 μm in radius, they are filtered off and separated. The filtrate is analyzed by ICP, as surface composition of the phosphor particles (herein, the term, ICP refers to "Inductively Coupled Plasma Emission Spectrometry"). Separated phosphor particles are washed with alcohol, dissolved in aqua regia and subjected to analysis by ICP, as central composition of the phosphor particles.

When a phosphor, having different compositions between the central portion and surface portion, is prepared in a liquid phase, it is necessary to make the concentration of a mother liquor as high as possible to allow the formed phosphor precursor to sufficiently ripen. The higher the concentration, the better; and the longer the ripening, the more desirable. In cases when the phosphor is prepared in a mother liquor low in concentration, the composition of the central portion of the phosphor tends to be identical to that of the surface portion, resulting in emission which is insufficient in stimulated emission and large in instantaneous emission. The resulting phosphor particles may have a composition which is continuously varied from the center to the surface.

It is preferable to prepare the rare earth activated alkaline earth metal fluorohalide stimulable phosphor of the invention by the liquid phase method in which the particle size can be readily controlled rather than by the solid phase method in which control of the particle size is difficult. It is preferable to prepare the stimulable phosphor according to the liquid phase method. The representative preparation method of the rare earth activated alkaline earth metal fluorohalide stimulable phosphor will be explained as below. Thus, there is described a preparation method of the rare earth activated alkaline earth metal fluorohalide stimulable phosphor particles having a central composition represented by BaFI:xA    (formula 1A) and surface composition represented by BaFX:xA    (formula 2A), in which A represents a rare earth metal selected from the group consisting of Eu, Ce and Gd; and x is a number within the range of $0.0001 \leq x \leq 0.2$, and M1, M2 or M3 is preferably contained, where M1 is an alkaline earth metal selected from the group consisting of Ca, Mg and Sr and contained in an amount of $5.0 \times 10^{-6}$ to 0.1% by weight (preferably $5.0 \times 10^{-6}$ to $1.0 \times 10^{-2}$ and more preferably $5.0 \times 10^{-6}$ to $5.0 \times 10^{-4}$%), M2 is at least one selected from the group consisting of $SiO_2$, $TiO_2$, $Al_2O_3$, $InF_3$, $Ga_2O_3$ and $Fe_2O_3$ and contained in an amount of $5.0 \times 10^{-7}$ to 0.1% by weight (preferably $5.0 \times 10^{-7}$ to $1.0 \times 10^{-3}$%) and M3 is an alkaline metal selected from the group consisting of Na, K and Rb and contained in an amount of $1.0 \times 10^{-6}$ to 0.1% by weight (preferably $1.0 \times 10^{-5}$ to $1.0 \times 10^{-2}$%)

Preparation method 1:

The method comprises the steps of:

(a) preparing an aqueous mother liquor containing at least two normal (i.e., 2N and preferably at least 2.7N) $BaI_2$ and a halide of A, provided that when $M^1$ is introduced, the mother liquor further contains a halide of $M^1$, when $M^2$ is introduced, the mother liquor further contains an alkoxide compound of $M^2$ and when $M^3$ is introduced, the mother liquor further contains a halide of $M^3$, (b) adding an aqueous solution containing an at least 5N inorganic fluoride (preferably, ammonium fluoride or alkali metal fluoride) to the mother liquor while maintaining a temperature of the mother liquor at 50° C. or more (preferably 80° C. or more) to form a crystalline precipitate of a precursor of the stimulable phosphor, (c) separating the precipitate of the precursor from mother liquor, and (d) calcining the separated precipitate (preferably, performing calcination of the precipitate while avoiding sintering of the precipitate);

Preparation method 2 the method comprises the steps of:

(a) preparing an aqueous mother liquor containing an at least 3N ammonium halide (preferably, at least 4N) and a halide of A (i.e., a chloride, bromide or iodide thereof), provided that when a is not zero, the mother liquor further contains a halide of $M^1$, when y is not zero, the mother liquor further contains an alkoxide compound of $M^2$ and when Z is not zero, the mother liquor further contains a halide of $M^3$, (b) adding an aqueous solution containing an at least 5N (preferably, at least 8N) inorganic fluoride (ammonium fluoride or alkali metal fluoride) and an aqueous solution containing $BaI_2$ to the mother liquor while maintaining a temperature of the mother liquor at 50° C. or more (preferably, adding the solutions with keeping constant a ratio of fluorine of the former solution to barium of the latter solution) to form a crystalline precipitate of a precursor of the stimulable phosphor, (c) separating the precipitate of the precursor from the mother liquor, and (d) calcining the separated precipitate (preferably, performing calcination of the precipitate while avoiding sintering of the precipitate).

The halide of A can be added at any time during the course of forming the precipitate. Thus, the halide may be added to a reaction mother liquor prior to the start of reaction, at the time of adding an aqueous solution of the inorganic fluoride (preferably ammonium fluoride or alkali metal fluoride), or at the time of or after adding the inorganic fluoride aqueous solution and an aqueous solution of $BaI_2$.

The preparing method 1 of the stimulable phosphor is further explained in detail, as below.

Preparation of a precipitate of precursor crystals and preparation of stimulable phosphor:

At first, material(s) except for a fluoride compound are dissolved in an aqueous medium. Thus, $BaI_2$ and a halide of A (and if necessary, a halide of $M^1$, an alkoxide compound of $M^2$ or a halide of $M^3$) are each added into an aqueous solvent and mixedly dissolved to prepare an aqueous solution. In this case, amounts of $BaI_2$ and the aqueous solvent are previously adjusted so as to have a concentration of $BaI_2$ of 2N or more. A small amount of acid, ammonia, alcohol, water-soluble polymer or fine grained powder of water-insoluble metal oxide may be added thereto. The solution (reaction mother liquor) is maintained at a constant temperature.

Next, into the reaction mother liquor maintained at a constant temperature with stirring, an aqueous solution of an inorganic fluoride (such as ammonium fluoride or alkali metal fluoride was introduced through a pipe provided with a pump. The aqueous solution is preferably introduced to a portion in which stirring is vigorously performed. Introduction of the fluoride aqueous solution into the reaction mother liquor results in precipitation of precursor crystals of the rare earth activated alkali earth metal fluorohalide phosphor represented by the formula (1A).

The resulting crystal of the phosphor precursor are separated from the solution through filtration or centrifugation, washed sufficiently with liquid such as methanol and dried. To the dried crystal of the phosphor precursor was added an anti-sintering agent such as alumina fine powder or silica fine powder, which is adhered to the surface of the crystals. It is possible to save addition of the anti-sintering agent by choosing the calcination condition.

Further, the phosphor precursor crystals are charged into a heat-resistant vessel such as silica port, alumina crucible or silica crucible and then placed in a central portion of an electric furnace to be calcined without causing the crystals to sinter. The crystals are calcined at a temperature of 400 to 1300° C. and preferably 500 to 1000° C. The calcination time is dependent on the charging amount of a raw material mixture of the phosphor, the calcination temperature and a temperature at the time of being taken out from the furnace, and preferably 0.5 to 12 hrs.

Calcination is carried out in an atmosphere, e.g., in a neutral atmosphere such as nitrogen gas atmosphere, argon gas atmosphere or nitrogen gas atmosphere containing a small amount of hydrogen gas, weakly reducing atmosphere such as carbon dioxide atmosphere containing a small amount of carbon mono-oxide, or an atmosphere in which a small amount of oxygen is introduced.

Thus, according to the above-described calcination, an objective stimulable phosphor of a rare earth activated alkali earth metal fluorohalide can be obtained.

The stimulable phosphor of a rare earth activated alkali earth metal fluoroiodide can also be prepared according to the method comprising (a) preparing an aqueous solution containing an ammonium halide ($NH_4Cl$, $NH_4Br$ or $NH_4I$) and a halide of Ln and with a concentration of the ammonium halide of 3N or more, provided that when a is not zero, the mother liquor further contains a halide of $M^1$, when y is not zero, the mother liquor further contains an alkoxide compound of $M^2$ and when Z is not zero, the mother liquor further contains a halide of $M^3$; (b) adding continuously or intermittently an aqueous solution containing an inorganic fluoride and an aqueous solution containing $BaI_2$ to the above-described aqueous solution while maintaining a constant temperature and with keeping a ratio of fluorine of the solution to barium of the solution to form a precipitate of precursor crystals of the rare earth activated alkali earth metal fluoroiodide stimulable phosphor; (c) separating the precipitate of the precursor crystals from a mixed aqueous solution; and (d) calcining the separated precipitate with avoiding sintering of the precipitate.

This method will be further explained in detail.

At first, material(s) except for a fluoride compound and $BaI_2$ and ammonium halide ($NH_4Br$, $NH_4Cl$ and $NH_4I$) are dissolved in an aqueous medium. Thus, an halide and a halide of Ln (and if necessary, a halide of $M^1$, an alkoxide compound of $M^2$ or a halide of $M^3$) are each added into an aqueous solvent and mixedly dissolved to prepare an aqueous solution. In this case, amounts of the ammonium halide and the aqueous solvent are previously adjusted so as to have a concentration of the ammonium halide of 3N or more. A small amount of acid, ammonia, alcohol, water-soluble polymer or fine grained powder of water-insoluble metal oxide may be added thereto. The solution (reaction mother liquor) is maintained at a constant temperature.

Next, into the reaction mother liquor maintained at a constant temperature with stirring, an aqueous solution of an inorganic fluoride (such as ammonium fluoride or alkali metal fluoride and an aqueous solution of $BaI_2$ were simultaneously introduced continuously or intermittently through a pipe provided with a pump, with adjusting so as to keep constant the ratio of the fluoride to $BaI_2$. The aqueous solution is preferably introduced to a portion in which stirring is vigorously performed. Introduction of the fluoride aqueous solution into the reaction mother liquor results in precipitation of precursor crystals of the rare earth activated alkali earth metal fluorohalide phosphor having the central composition represented by the formula (1A) and the surface composition represented by formula (2A).

Subsequently, the resulting crystals of the phosphor precursor are separated from the solvent, dried and subjected to calcination in a manner similar to the method 1 to obtain an objective stimulable phosphor of a rare earth activated alkaline earth metal fluoroiodide.

An average particle size of the rare earth activated alkaline earth metal fluorohalide stimulable phosphor is preferably 0.8 to 15 μm and more preferably 1 to 8 μm. The average particle size is a mean value of sphere equivalent diameters of 200 particles which are selected at random from the electronmicrograph. Herein, the sphere equivalent diameter is referred to as a diameter of a sphere having a volume equivalent to that of the particle.

Phosphor particles (crystals) relating to the invention are preferably monodisperse, and distribution of the average particle size (i.e., a coefficient of variation of the particle size) is 20% or less and preferably 15% or less.

Preparation of panel:

As supports used in the radiation image converting panel according to the invention are employed a various types of polymeric material, glass and metals. Materials which can be converted to a flexible sheet or web are particularly preferred in handling as a information recording material. From this point, there are preferred plastic resin films such as cellulose acetate films, polyester films, polyamide films, polyimide films, triacetate films or polycarbonate films; metal sheets such as aluminum, iron, copper or chromium; or metal sheets having a said metal oxide covering layer.

A thickness of the support depends on properties of the material, and is generally 80 to 1000 μm and preferably 80 to 500 μm in terms of handling. The surface of the support may be glossy or may be matte for the purpose of enhancing adhesiveness to a stimulable phosphor layer. The support may be provided with a subbing layer under the stimulable phosphor layer for the purpose of enhancing adhesiveness to the phosphor layer.

Examples of binders used in the stimulable phosphor layer according to the invention include proteins such as gelatin, polysaccharide such as dextran, natural polymeric materials such as arabic gum and synthetic polymeric materials such as polyvinyl butyral, polyvinyl acetate, nitrocellulose, ethylcellulose, vinylidene chloride/vinyl chloride copolymer, polyalkyl (metha)acrylate, vinyl chloride/vinylacetate copolymer, polyurethane, cellulose acetate butylate, polyvinyl alcohol and linear polyester. Of these binders are preferred nitrocellulose, linear polyester, polyalkyl (metha)acrylate, a mixture of nitrocellulose and linear polyester, a mixture of nitrocellulose and polyalkyl (metha)acrylate and a mixture of polyurethane and polyvinyl butyral. The binder may be cured with a cross-linking agent.

The stimulable phosphor layer can be coated on a subbing layer, for example, according to the following manner. Thus, an iodide-containing stimulable phosphor, a compound such a phosphite ester for preventing yellow stain and binder are added into an optimal solvent to prepare a coating solution in which phosphor particles and particles of the compound (s) are uniformly dispersed in a binder solution.

The binder is employed in an amount of 0.01 to 1 part by weight per 1 part by weight of the stimulable phosphor. A smaller amount of the binder is preferred in terms of sensitivity and sharpness of the radiation image converting panel and a range of 0.03 to 0.2 parts by weight is preferred in terms of easiness of coating.

A ratio of the binder to the stimulable phosphor (with the proviso that in the case of all of the binder being an epoxy group-containing compound, the ratio is that of the compound to the phosphor) depends on characteristics of the objective radiation image converting panel, the kind of the phosphor and an addition amount of the epoxy group-containing compound. Examples of solvents used for preparing the coating solution include lower alcohols such as methanol, ethanol, 1-propanol, 2-propanol, and n-butanol; chlorine-containing hydrocarbons such as methylene chloride and ethylene chloride; ketones such as acetone, methyl ethyl ketone, methyl isobutyl ketone; esters of a lower fatty acid and lower alcohol such as methyl acetate, ethyl acetate and butyl acetate; ethers such as dioxane, ethylene glycol ethyl ether and ethylene glycol monomethyl ether; toluene; and a mixture thereof.

Examples of solvents used for preparing a coating solution of a stimulable phosphor layer include lower alcohols such as methanol, ethanol, isopropanol and n-butanol; ketones such as acetone, methyl ethyl ketone, methyl isobutyl ketone and cyclohexanone; esters of a lower fatty acid and lower alcohol such as methyl acetate, ethyl acetate and butyl acetate; ethers such as dioxane, ethylene glycol ethyl ether and ethylene glycol monomethyl ether; aromatic compounds such as tolyol and xylol; halogenated hydrocarbons such as methylene chloride and ethylene chloride; and a mixture thereof.

There may be incorporated, in the coating solution, a variety of additives, such as a dispersing agent for improving dispersibility of the phosphor in the coating solution and a plasticizer for enhancing bonding strength between the binder and phosphor. Examples of the dispersing agent include phthalic acid, stearic acid, caproic acid and oleophilic surfactants. Examples of the plasticizer include phosphate esters such as triphenyl phosphate, tricresyl phosphate and diphenyl phosphate; phthalate esters such as diethyl phthalate, dimethoxyethyl phthalate; glycolic acid esters such as ethylphthalyethyl glycolate and dimethoxyethyl glycolate; and polyesters of polyethylene glycol and aliphatic dibasic acid such as polyester of triethylene glycol and adipinic acid, and polyester of diethylene glycol and succinic acid.

There may be incorporated, in a coating solution of the stimulable phosphor layer, stearic acid, phthalic acid, caproic acid and oleophilic surfactants for the purpose of improving dispersibility of the stimulable phosphor particles. The plasticizer may optionally incorporated. Examples of the plasticizer include phthalate esters such as diethyl phthalate and dibutyl phthalate; aliphatic dibasic acid esters such as diisodecyl succinate and dioctyl adipinate; and glycolic acid eaters such as ethylphthalylethyl glycolate and butylphthalylbutyl glycolate.

The coating solution as prepared above was uniformly coated on the surface of the subbing layer to form a coating layer. Coating can be carried out by conventional coating means, such as doctor blade, roll coater and knife coater. Subsequently, the coated layer is gradually dried to complete formation of the stimulable phosphor layer on the subbing layer. The coating solution of the stimulable phosphor layer can be prepared by using a dispersing apparatus, such as a ball mill, sand mill, atriter, three-roll mill, high-speed impeller, Kady mill and ultrasonic homogenizer. The prepared coating solution is coated on a support by using a doctor blade, roll coater or knife coater and dried to form the stimulable phosphor layer. After the above coating solution may be coated on a protective layer and dried, the stimulable phosphor layer may be adhered to the support. A thickness of the stimulable phosphor layer of the radiation image converting panel depends on characteristics of the converting panel, the kind of the stimulable phosphor and a mixing ratio of the binder to the stimulable phosphor, and is generally 20 μm to 1000 μm and preferably 20 to 500 μm.

EXAMPLES

Embodiments of the present invention will be explained based on the following examples.

Example 1

Synthesis of europium activated barium fluoroiodide stimulable phosphor:

The reaction vessel was charged with 2500 ml of $BaI_2$ aqueous solution (3.5N) and 125 ml of $EuBr_3$ aqueous solution (0.04N). Further thereto were added $SrI_2$ and NaI so as to have a Sr-concentration of 100 ppm and Na-concentration of 2000 ppm. Reaction mother liquor in the reaction vessel was maintained at a temperature of 83° C. with stirring, and thereto was added an aqueous solution of ammonium fluoride (8N) by using a roller pump to form precipitates. Thereafter, the reaction mixture was further kept at the temperature for 2 hr. with stirring to ripen the precipitates. The precipitates were filtered, washed with methanol and dried in vacuo to obtain crystals of a phosphor precursor of europium activated barium fluoroiodide. To prevent deformation of phosphor particles due to sintering during calcination and the change of particle size distribution due to fusing of particles, ultrafine-grained alumina was added thereto in an amount of 1% by weight, with stirring sufficiently to cause the alumina to adhere uniformly to the surface of the crystals. The crystals were charged into a silica boat and calcined at 850° C. for 2 hrs. in an atmosphere of hydrogen gas, using a tube furnace to obtain europium activated barium fluoroiodide phosphor particles. The particles were subjected to classification to obtain phosphor particles with an average size of 7 μm.

A radiation image conversion panel was prepared as follows. The prepared phosphor (a) of europium activated barium fluoroiodide of 342 g and a polyester resin (Toyobo Biron 200)) of 18 g were added into a mixed solvent of methyl ethyl ketone and toluene (1:1) and dispersed by a propeller mixer and a coating solution of a phosphor layer with a viscosity of 25 to 30 PS. The coating solution was coated on a subbed polyethylene terephthalate film by using a doctor blade and dried at 100° C. for 15 min. and a phosphor layer with a given thickness was formed.

Fluoro-resin, fluoroolefin-vinyl ether copolymer (Lumiflon LF100, trade name, produced by Asahi Glass Co.) of 70 g and cross-linking agent, isocyanate (Nippon Polyurethane C-3041) of 25 g were added into a mixed solvent of toluene-isopropyl alcohol (1:1) and a coating solution of a protective layer was obtained. The coating solution was coated on the formed phosphor layer by using a doctor blade and dried at 120° C. for 30 min. to thermally harden the layer and a protective layer with a thickness of 10 μm was obtained. According to the above procedure, there was obtained a radiation image conversion panel comprising a stimulable phosphor layer.

Example 2

A stimulable phosphor (b) and radiation image conversion panel were prepared in the same manner as in Example 1, except that dimethoxydimethylsilane was added to the reaction mother liquor to form stimulable phosphor precursor crystals.

Example 3

To synthesize crystals of a phosphor precursor of europium activated barium fluoroiodide, the reaction vessel was charged with 2125 ml of $BaBr_2$ aqueous solution (2.35N) and 125 ml of $EuBr_3$ aqueous solution (0.04N). Further thereto were added $CaBr_2$, NaBr and KBr so as to have a Ca-concentration of 80 ppm and Na-concentration of 1000 ppm and K-concentration of 200 ppm. Reaction mother liquor in the reaction vessel was maintained at a temperature of 83° C. with stirring. A stimulable phosphor precursor was prepared in the same manner as in Example 1, except that the reaction mother liquor of example 1 was replaced by the above-described reaction mother liquor. Using the prepared stimulable phosphor (c), a radiation image conversion panel was prepared in the same manner as in Example 1.

Comparative Example 1

$BaI_2.2H_2O$ powder (427.2 g) and $BaF_2$ powder (175.4 g) and $EuI_3$ powder (1.6 g) were sufficiently mixed in a mortar and heated at 1000° C. for 4 hrs. under hydrogen gas environment using a tube-type electric furnace to obtain europium activated barium fluoroiodide stimulable phosphor. The resulting phosphor was ground and classified to obtain the phosphor (d) with an average particle size of 7 μm. Using the phosphor, a radiation image conversion panel was prepared in the same manner as in Example 1.

Comparative Example 2

$BaI_2.2H_2O$ powder (333.2 g) and $BaF_2$ powder (175.4 g) and $EuI_3$ powder (1.6 g) were sufficiently mixed in a mortar and heated at 1100° C. for 4 hrs. under hydrogen gas environment using a tube-type electric furnace to obtain europium activated barium fluoroiodide stimulable phosphor. The resulting phosphor was ground and classified to obtain the phosphor (e) with an average particle size of 7 μm. Using the phosphor, a radiation image conversion panel was prepared in the same manner as in Example 3.

Comparative Example 3

The reaction vessel was charged with 26250 ml of $BaBr_2$ aqueous solution (1.14N) and 125 ml of $EuBr_3$ aqueous solution (0.04N). Reaction mother liquor in the reaction vessel was maintained at a temperature of 83° C. with stirring, and thereto were added 250 ml of an aqueous solution of ammonium fluoride (8N) at a controlled flow rate by using a roller pump to form precipitates. Thereafter, the reaction mixture was further kept at the temperature for 2 hr. with stirring to ripen the precipitates. The precipitates were filtered, washed with methanol and dried in vacuo to obtain crystals of a phosphor of europium activated barium fluoroiodide (f). Using the obtained phosphor crystals, a radiation image conversion panel was prepared in the same manner as in Example 1.

Example 4

The reaction vessel was charged with 2500 ml of $BaI_2$ aqueous solution (3.5 mol/l) and 125 ml of $EuI_3$ aqueous solution (0.2 mol/l). Reaction mother liquor in the reaction vessel was maintained at a temperature of 85° C. with stirring, and thereto were added 175 ml of an aqueous solution of $NH_4F$ (8.0 mol/l) and 125 ml of $EuI_3$ aqueous solution (0.2 mol/l) for 42 min. and further thereto was added 150 ml of a mixture solution of $NH_4Br$ and $NH_4F$ in a ratio of 1:1 (4.0 mol/l) for 18 min. A stimulable phosphor precursor was prepared in the same manner as in Example 1, except that the reaction mother liquor of example 1 was replaced by the above-described reaction mother liquor. Using the prepared stimulable phosphor (g), a radiation image conversion panel was prepared in the same manner as in Example 1.

Example 5

A stimulable phosphor (h) was prepared in the same manner as in Example 2, except that Sr and $EuI_3$ were replaced by Ca and $GdI_3$, respectively. Using the prepared stimulable phosphor (h), a radiation image conversion panel was prepared in the same manner as in Example 1.

Example 6

A stimulable phosphor (i) was prepared in the same manner as in Example 2, except that Sr and $EuI_3$ were replaced by Mg and $CeI_3$, respectively. Using the prepared stimulable phosphor (i), a radiation image conversion panel was prepared in the same manner as in Example 1.

Example 7

A stimulable phosphor (j) was prepared in the same manner as in Example 1, except that the reaction time was shortened. Using the prepared stimulable phosphor (j), a radiation image conversion panel was prepared in the same manner as in Example 1.

Example 8

A stimulable phosphor (k) was prepared in the same manner as in Example 7, except that the reaction time was further shortened. Using the prepared stimulable phosphor (k), a radiation image conversion panel was prepared in the same manner as in Example 1.

Compositions of the phosphors described in Examples were shown in Table 1.

TABLE 1

| Phosphor | Surface portion | | | | Central portion | | | |
| --- | --- | --- | --- | --- | --- | --- | --- | --- |
|  | A | $M^1$ | $M^2$ | $M^3$ | A | $M^1$ | $M^2$ | $M^3$ |
| a | $0.9 \times 10^{-3}$ | $3.0 \times 10^{-5}$ | — | $8.0 \times 10^{-5}$ | $1.0 \times 10^{-3}$ | — | — | — |
| b | $0.8 \times 10^{-3}$ | $3.0 \times 10^{-5}$ | $2.0 \times 10^{-3}$ | $8.0 \times 10^{-5}$ | $1.0 \times 10^{-3}$ | — | — | — |
| c | $0.9 \times 10^{-3}$ | $3.0 \times 10^{-5}$ | — | $1.7 \times 10^{-5}$ | $1.3 \times 10^{-3}$ | — | — | — |
| d | $1.0 \times 10^{-3}$ | — | — | — | $1.0 \times 10^{-3}$ | — | — | — |
| e | $1.3 \times 10^{-3}$ | — | — | — | $1.3 \times 10^{-3}$ | — | — | — |
| f | $1.3 \times 10^{-3}$ | — | — | — | $1.3 \times 10^{-3}$ | — | — | — |
| g | $7.7 \times 10^{-7}$ | — | — | — | $1.0 \times 10^{-3}$ | — | — | — |
| h | $0.8 \times 10^{-3}$ | $3.0 \times 10^{-5}$ | $2.0 \times 10^{-3}$ | $8.0 \times 10^{-5}$ | $1.0 \times 10^{-3}$ | — | — | — |
| i | $0.8 \times 10^{-3}$ | $3.0 \times 10^{-5}$ | $2.0 \times 10^{-3}$ | $8.0 \times 10^{-5}$ | $1.0 \times 10^{-3}$ | — | — | — |
| j | $1.0 \times 10^{-4}$ | $3.0 \times 10^{-4}$ | — | $1.0 \times 10^{-3}$ | $1.0 \times 10^{-3}$ | $1.0 \times 10^{-5}$ | — | $1.0 \times 10^{-3}$ |
| k | $1.0 \times 10^{-5}$ | $2.0 \times 10^{-2}$ | — | $2.0 \times 10^{-2}$ | $1.0 \times 10^{-3}$ | $1.0 \times 10^{-4}$ | — | $3.0 \times 10^{-2}$ |

The composition of the phosphor can be determined according to the following procedure. A phosphor sample is allowed to be dipped into aqua regia to decompose from the surface of phosphor particles and when the phosphor particles become 0.2 μm in radius, they are filtered off and separated. The filtrate is analyzed by ICP, as surface composition of the phosphor particles. Separated phosphor particles are washed with alcohol, dissolved in aqua regia and subjected to analysis by ICP, as central composition of the phosphor particles. Herein, the term, ICP refers to "Inductively Coupled Plasma Emission Spectrometry". The ICP employed was ICP-MS, which is a combination of ICP with a mass spectrometer. The apparatus employed was an ICP-MS produced by Seiko Denshi Kogyo. A calibration curve for each element to be measured is prepared from a standard reagent (solution containing a known amount of the objective element). Measurement principle of ICP is referred to K. Fuwa "ICP Emission Spectrometry" published by Kyoritsu Shuppan.

Radiation image conversion panels obtained in Examples 1 to 8 and Comparative Examples 1 to 3 were evaluated with respect to the following items.

Evaluation of intensity

A radiation image conversion panel, after being exposed to a X-ray at tube voltage of 80 KVp, was stimulated by scanning exposure with a 200 mW semiconductor laser (780 nm) and stimulated emission emitted from the phosphor layer was measured by a photoreceptor (photomultiplier R1305, produced by Hamamatsu Photonics Co.) to determine the emission intensity (i.e., sensitivity). The intensity was measured immediately after the radiation image conversion panel was prepared (denoted as S). Further, the intensivity was also measured after the panel was allowed to stand at 60° C. and 90% RH for 1 month (denoted as S'). Stability with respect to the ntensity was expressed in terms of S'/S×100(%). In the case when the sensitivity does not vary, this value is to be 100%, and the more the sensitivity varies, the value becomes smaller. In cases where a signal value in the intensity measurement is obtained through a log-amplifier, the value is converted to a linear value and is then evaluated.

Evaluation of erasability

A radiation image conversion panel, after being exposed to X-ray at a tube voltage of 80 KVp, was stimulated by scanning exposure with a 200 mW semiconductor laser (780 nm) and stimulated emission emitted from the phosphor layer was measured by a photoreceptor (photomultiplier R1305, produced by Hamamatsu Photonics Co.) to determine the emission intensity (S). After measurement, the radiation image conversion panel was exposed overall to light for 10 sec. using three 700 W halogen-lamps and then stimulated by scanning exposure with a 200 mW semiconductor laser (780 nm) to determine the stimulated emission intensity (S"). Erasability was expressed in terms of residual ratio after erasing, i.e., S"/S. The less this value, the better the erasability.

Evaluation of S/N ratio

A radiation image conversion panel, after being exposed to X-ray at a tube voltage of 80 KVp, was stimulated by scanning exposure with a 200 mW semiconductor laser (780 nm) and stimulated emission emitted from the phosphor layer was measured by a photoreceptor (photomultiplier R1305, produced by Hamamatsu Photonics Co.) to determine the emission intensity (S). Further, after similarly exposed to X-ray in the same manner as above, emission from the plate, without exposure to laser was measure to determine the intensity (N), i.e., afterglow of instantaneous emission.

TABLE 2

| | N/S ratio | Stability of intensity | Erasability |
|---|---|---|---|
| Example 1 | not more than 0.00001 | 100 (%) | 0.0001 |
| Example 2 | not more than 0.00001 | 100 | 0.00006 |
| Example 3 | not more than 0.00001 | 100 | not more than 0.00001 |
| Example 4 | not more than 0.00001 | 100 | 0.0001 |
| Example 5 | 0.00005 | 100 | not more than 0.00001 |
| Example 6 | 0.0001 | 100 | not more than 0.00001 |
| Example 7 | 0.00005 | 100 | not more than 0.00001 |
| Example 8 | 0.0001 | 100 | not more than 0.00001 |
| Comparative 1 | 0.01 | 65 | 0.2 |
| Comparative 2 | 0.007 | 70 | 0.15 |
| Comparative 3 | 0.006 | 68 | 0.14 |

As can be seen from the Table, examples of the invention were superior in image characteristics including N/S ratio, stability of the intensity and erasability.

What is claimed is:

1. A stimulable phosphor comprising a rare earth activated alkaline earth metal fluorohalide stimulable phosphor, wherein said rare earth is a rare earth metal selected from the group consisting of Eu, Ce and Gd, and a content of the rare earth metal in a surface portion of the particles of said stimulable phosphor being less that in a central portion of said particles.

2. The stimulable phosphor of claim 1, wherein said central portion is comprised of a phosphor represented by the following formula:

$$BaFX:xA$$

wherein X is at least a halogen atom selected from the group consisting of Cl, Br and I; A is a rare earth metal selected from the group consisting of Eu, Ce and Gd; and x is a number meeting the condition of $0.0001 \leq x \leq 0.2$.

3. The stimulable phosphor of claim 2, wherein X is comprised of I and a halogen atom selected from the group consisting of Cl and Br.

4. The stimulable phosphor of claim 2, wherein A is Eu.

5. The stimulable phosphor of claim 2, wherein said stimulable phosphor contains M1, M2 or M3, where M1 is an alkaline earth metal selected from the group consisting of Ca, Mg and Sr and contained in an amount of $5.0 \times 10^{-6}$ to 0.1% by weight; M2 is at least one selected from the group consisting of $SiO_2$, $TiO_2$, $Al_2O_3$, $InF_3$, $Ga_2O_3$ and $Fe_2O_3$ and contained in an amount of $5.0 \times 10^{-7}$ to 0.1% by weight; and M3 is an alkaline metal selected from the group consisting of Na, K and Rb and contained in an amount of $1.0 \times 10^{-5}$ to 0.1% by weight.

6. A radiation image conversion panel comprising a support having thereon a phosphor layer containing a stimulable phosphor, wherein said stimulable phosphor is a rare earth activated alkaline earth metal fluorohalide stimulable phosphor, said rare earth being a rare earth metal selected from the group consisting of Eu, Ce and Gd and a content of a rare earth metal in a surface portion of the particles of said stimulable phosphor being less that in a central portion of said particles.

7. The radiation image conversion panel of claim 6, wherein said central portion is comprised of a phosphor represented by the following formula:

$$BaFX:xA$$

wherein X represents a halogen atom selected from the group consisting of Cl, Br and I; A represents a rare earth metal selected from the group consisting of Eu, Ce and Gd; and x is a number within the range of $0.0001 \leq x \leq 0.2$.

8. The radiation image conversion panel of claim 7, wherein X is comprised of I and a halogen atom selected from the group consisting of Cl and Br.

9. The radiation image conversion panel of claim 7, wherein A is Eu.

10. The radiation image conversion panel of claim 7, wherein said stimulable phosphor contains M1, M2 or M3, where M1 is an alkaline earth metal selected from the group consisting of Ca, Mg and Sr and contained in an amount of $5.0 \times 10^{-6}$ to 0.1% by weight; M2 is at least one selected from the group consisting of $SiO_2$, $TiO_2$, $Al_2O_3$, $InF_3$, $Ga_2O_3$ and $Fe_2O_3$ and contained in an amount of $5.0 \times 10^{-7}$ to 0.1% by weight; and M3 is an alkaline metal selected from the group consisting of Na, K and Rb and contained in an amount of $1.0 \times 10^{-5}$ to 0.1% by weight.

* * * * *